(12) United States Patent
Laliena Iranzo et al.

(10) Patent No.: US 12,473,609 B2
(45) Date of Patent: *Nov. 18, 2025

(54) COATED STEEL SUBSTRATE

(71) Applicant: ArcelorMittal, Luxembourg (LU)

(72) Inventors: Carlos Laliena Iranzo, Asturias (ES); Marcos Perez Rodriguez, Asturias (ES)

(73) Assignee: ArcelorMittal, Luxembourg (LU)

( * ) Notice: Subject to any disclaimer, the term of this patent is extended or adjusted under 35 U.S.C. 154(b) by 486 days.

This patent is subject to a terminal disclaimer.

(21) Appl. No.: 16/768,569

(22) PCT Filed: Dec. 11, 2018

(86) PCT No.: PCT/IB2018/059873
§ 371 (c)(1),
(2) Date: May 29, 2020

(87) PCT Pub. No.: WO2019/123105
PCT Pub. Date: Jun. 27, 2019

(65) Prior Publication Data
US 2020/0318213 A1    Oct. 8, 2020

(30) Foreign Application Priority Data
Dec. 19, 2017    (WO) .................. PCT/IB2017/058105

(51) Int. Cl.
*C21D 9/46*    (2006.01)
*C21D 1/70*    (2006.01)
(Continued)

(52) U.S. Cl.
CPC .............. *C21D 9/46* (2013.01); *C21D 1/70* (2013.01); *C21D 8/0205* (2013.01);
(Continued)

(58) Field of Classification Search
CPC ...... C21D 1/70; C21D 8/0284; C21D 8/0484; C08K 3/042; C08K 3/22; C08K 3/30;
(Continued)

(56) References Cited

U.S. PATENT DOCUMENTS 3,957,673 A      5/1976 Umezono et al.
6,576,336 B1 *   6/2003 LeGrande ............ H01B 1/22
                                                    138/146

(Continued)

FOREIGN PATENT DOCUMENTS

CN       1 510089 A       7/2004
CN       101696328 A      4/2010
(Continued)

OTHER PUBLICATIONS

Albert V. Tamashausky, Graphite a Multifunctional Additive for Paint and Coatings, Oct. 2003, pp. 64-79 (Year: 2003).*
(Continued)

*Primary Examiner* — Jonathan Johnson
(74) *Attorney, Agent, or Firm* — Davidson Kappel LLC

(57) ABSTRACT

A coated steel substrate including a coating including nanographite having a lateral size between 1 and 60 μm and a binder, wherein the steel substrate has the following compositions in weight percent: $0.31 \leq C \leq 1.2\%$, $0.1 \leq Si \leq 1.7\%$, $0.7 \leq Mn \leq 3.0\%$, $P \leq 0.01\%$, $S \leq 0.1\%$, $Cr \leq 0.5\%$, $Ni \leq 0.5\%$, $Mo \leq 0.1\%$, and on a purely optional basis, one or more elements such as $Nb \leq 0.05\%$, $B \leq 0.003\%$, $Ti \leq 0.06\%$, $Cu \leq 0.1\%$, $Co \leq 0.1\%$, $N \leq 0.01\%$, $V \leq 0.05\%$, the remainder of the composition being made of iron and inevitable impurities resulting from the elaboration; and a method for the manufacture of the coated steel substrate.

21 Claims, 1 Drawing Sheet

(51) Int. Cl.
*C21D 8/02* (2006.01)
*C21D 9/04* (2006.01)
*C22C 38/02* (2006.01)
*C22C 38/04* (2006.01)
*C22C 38/42* (2006.01)
*C22C 38/44* (2006.01)
*C22C 38/46* (2006.01)
*C22C 38/50* (2006.01)

(52) U.S. Cl.
CPC ............. *C21D 8/0226* (2013.01); *C21D 9/04* (2013.01); *C22C 38/02* (2013.01); *C22C 38/04* (2013.01); *C22C 38/42* (2013.01); *C22C 38/44* (2013.01); *C22C 38/46* (2013.01); *C22C 38/50* (2013.01)

(58) Field of Classification Search
CPC .... C08K 2003/2227; C08K 2003/3081; C09D 1/02; C09D 7/61; C09D 7/69; C09D 7/70; C09D 1/00; C09D 5/08; C22C 38/02; C22C 38/04; C22C 38/34; B82Y 30/00
See application file for complete search history.

(56) References Cited

U.S. PATENT DOCUMENTS

| | | | |
|---|---|---|---|
| 7,909,950 B2* | 3/2011 | Kimura | C22C 38/12 148/602 |
| 10,100,381 B2 | 10/2018 | Miyoshi et al. | |
| 10,518,506 B2 | 12/2019 | Miyazono et al. | |
| 2004/0016530 A1 | 1/2004 | Schoen et al. | |
| 2005/0009711 A1* | 1/2005 | Hinterwaldner | C09D 127/06 29/700 |
| 2006/0233955 A1 | 10/2006 | Smith et al. | |
| 2008/0233295 A1 | 9/2008 | Ye et al. | |
| 2011/0200825 A1* | 8/2011 | Chakraborty | B05D 3/062 428/524 |
| 2011/0226389 A1 | 9/2011 | Ueda et al. | |
| 2014/0234659 A1 | 8/2014 | Kawata et al. | |
| 2016/0024310 A1* | 1/2016 | McMullin | C09D 7/62 523/400 |
| 2016/0151864 A1 | 6/2016 | Rector et al. | |
| 2017/0137910 A1 | 5/2017 | Girina et al. | |

FOREIGN PATENT DOCUMENTS

| | | | |
|---|---|---|---|
| CN | 103540862 | A | 1/2014 |
| CN | 103597117 | A | 2/2014 |
| CN | 105473257 | A | 4/2016 |
| CN | 106471138 | A | 3/2017 |
| EP | 1932933 | A1 | 6/2008 |
| EP | 2361995 | A1 | 8/2011 |
| EP | 2 818497 | A2 | 12/2014 |
| JP | S505207 | A | 1/1975 |
| JP | S556413 | A | 1/1980 |
| JP | S5672120 | A | 6/1981 |
| JP | H01240614 | A | 9/1989 |
| JP | H03122249 | A | 5/1991 |
| JP | 2000319758 | A | 11/2000 |
| JP | 2001073033 | A | 3/2001 |
| JP | 2016223011 | A | 12/2016 |
| KR | 20070121055 | A | 12/2007 |
| KR | 2017-0071678 | A | 6/2017 |
| RU | 2318883 | C2 | 3/2008 |
| RU | 2585889 | C2 | 6/2016 |
| WO | WO2015190432 | A1 | 12/2015 |
| WO | WO 2017/109560 | A2 | 6/2017 |

OTHER PUBLICATIONS

Waybackmachine, Durachem Specialty Products https://web.archive.org/web/20170704065604/http://durachem.com/specialtyproducts.html, Jul. 4, 2017 (Year: 2017).*

ASM Committee, Carbon and Low-alloy steel sheet and strip, 1990, ASM International, ASM Handbook vol. 1, pp. 200-211 ( Year: 1990).*

G. D. Lahoti and P. M. Pauskar, Flat, Bar, and Shape Rolling, 2005, ASM International, ASM Handbook vol. 14A, pp. 459-479 (Year: 2005).*

International Search Report of PCT/IB2018/059873, Mar. 1, 2019.

* cited by examiner

COATED STEEL SUBSTRATE

The present invention relates to a steel substrate coated with a coating including nanographite, having a specific lateral size, and a binder, and to a method for the manufacture of this coated steel substrate. It is particularly well suited for the steel industry.

BACKGROUND

In the steel route production, after the steel making step, the steel is casted in the continuous casting. Semi-products, such as slabs, billets or blooms, are thus obtained. Usually, the semi-products are reheated at high temperature in a reheating furnace to dissolve the precipitates formed during the continuous casting and to obtain a hot workability. They are then descaled and hot-rolled. However, during the reheating step, semi-products, especially having high carbon content, decarburized resulting in a change of mechanical properties. Indeed, during the reheating step, the semi-product can lose a large carbon content. For example, rails steels decarburize leading in a decrease the hardness of the steel. Consequently, mechanical properties at the rail head are low and mechanical properties of the whole rail head are heterogeneous. Thus, there is a need to find a way to prevent the decarburization of a steel substrate during the reheating.

The patent application CN101696328 discloses a protective coating for a surface of a steel piece in order to prevent the surface from oxidation and decarburization at high temperature and, improve hardness and abrasion resistance and ultimately increase the overall service life of the steel workpiece, for the case of oxidation and decarburization of a surface (substrate) of a steel workpiece at high temperature, and the surface oxidation decarburization under the oxidizing atmosphere during heat treatment, forging, hot rolling, roll forming heating, particularly for the case that the steel workpiece is easy to be oxidized and decarbonized at high temperature in a heat treatment, leading to reduction in carbon atoms and carbon content, and the change in the surface (substrate) microstructure results in a reduced hardness, a reduced abrasion resistance and a short overall service life.

In this patent application, the coating has a composition of: graphite, water glass and surface penetrant, in which a volume ratio of the graphite to sodium silicate is 1:3 to 1:7, and the surface penetrant constitutes 0.05% to 0.15% by volume of the coating. Nevertheless, the tests were performed with low carbon steels including 25 (carbon steel) and HT300 (cast iron) and with very high alloy steels including 32CrMo and Mn13.

SUMMARY OF THE INVENTION

An object of the present invention is to provide a hot steel product having a specific steel composition, wherein the decarburization is significantly reduced during the reheating step.

The present invention provides coated steel substrate comprising a coating comprising nanographite having a lateral size between 1 and 60 µm and a binder, wherein the steel substrate has the following compositions in weight percent:
$0.31 \leq C \leq 1.2\%$,
$0.1 \leq Si \leq 1.7\%$,
$0.7 \leq Mn \leq 3.0\%$,
$P \leq 0.01\%$,
$S \leq 0.1\%$,
$Cr \leq 0.5\%$,
$Ni \leq 0.5\%$,
$Mo \leq 0.1\%$,
and on a purely optional basis, one or more elements such as
$Nb \leq 0.05\%$,
$B \leq 0.003\%$,
$Ti \leq 0.06\%$,
$Cu \leq 0.1\%$,
$Co \leq 0.1\%$,
$N \leq 0.01\%$,
$V \leq 0.05\%$,
the remainder of the composition being made of iron and inevitable impurities resulting from the elaboration.

Methods for the manufacture of a coated steel substrate and of a hot rolled steel product also are provided as is the use of a hot rolled steel product.

BRIEF DESCRIPTION OF THE DRAWINGS

To illustrate the invention, various embodiments and trials of non-limiting examples will be described, particularly with reference to the following Figure.

Other characteristics and advantages of the invention will become apparent from the following detailed description of the invention.

DETAILED DESCRIPTION

The invention relates to a coated steel substrate comprising a coating comprising nanographite having a lateral size between 1 and 60 µm and a binder, wherein the steel substrate has the following compositions in weight percent:
$0.31 \leq C \leq 1.2\%$,
$0.1 \leq Si \leq 1.7\%$,
$0.7 \leq Mn \leq 3.0\%$,
$P \leq 0.01\%$,
$S \leq 0.1\%$,
$Cr \leq 0.5\%$,
$Ni \leq 0.5\%$,
$Mo \leq 0.1\%$,
and on a purely optional basis, one or more elements such as
$Nb \leq 0.05\%$,
$B \leq 0.003\%$,
$Ti \leq 0.06\%$,
$Cu \leq 0.1\%$,
$Co \leq 0.1\%$,
$N \leq 0.01\%$,
$V \leq 0.05\%$,
the remainder of the composition being made of iron and inevitable impurities resulting from the elaboration.

Without willing to be bound by any theory, it seems that a coating comprising nanographite having a lateral size between 1 and 60 µm and a binder on a steel substrate having the above specific steel composition reduces the decarburization during the reheating of the coated steel substrate. The inventors have found that not only the steel composition but also the nature of coating plays an important role on the reduction or the elimination of steel decarburization during the heating treatment.

Indeed, it seems that there is a competition between oxidation and decarburization kinetics during the reheating.

Figure 1:
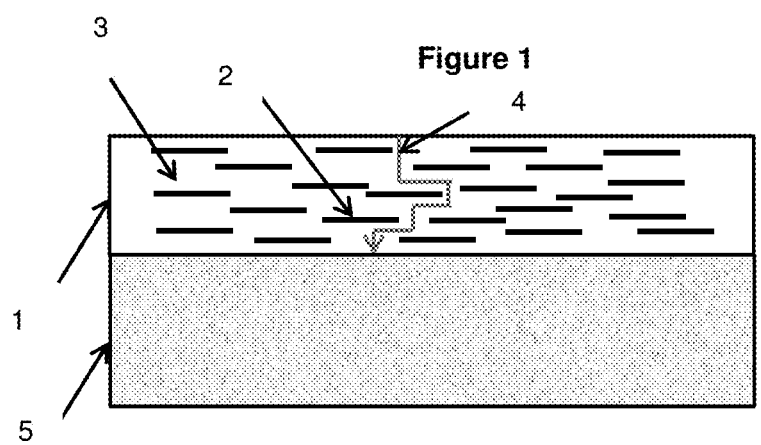
FIG. 1 illustrates an example of coated steel substrate according to the present invention.

For the above specific steel substrate (5), the formation of iron of the steel into scale reduces the decarburized layer. Additionally, as illustrated in FIG. 1, it is believed that in the coating (1) nanographite flakes (2) having the specific lateral size are well dispersed into the binder (3) forming a tortuous path (4) allowing a carburization of the decarburized areas. Indeed, it seems that there is a carbon restoration due to the presence of nanographite having the specific lateral size into the coating.

Regarding the chemical composition of the steel, preferably, the C amount is between 0.31 and 1.0% by weight.

Preferably, the Mn amount is between 0.9 and 2.5% and preferably between 1.1 and 2.0% by weight.

Advantageously, the amount of Cr is below or equal to 0.3% by weight.

Preferably, the amount of Ni is below or equal to 0.1% by weight.

Advantageously, the amount of Mo is below or equal to 0.1%.

Figure 2:
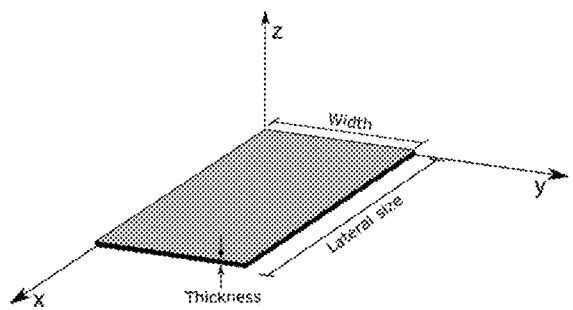
FIG. 2 illustrates an example of a nanographite coating over a steel substrate according to the present invention.

FIG. 2 illustrates an example of nanographite flake according to the present invention. In this example, the lateral size means the highest length of the nanoplatelet through the X axis and the thickness means the height of the nanoplatelet through the Z axis. The width of the nanoplatelet is illustrated through the Y axis.

Preferably, the lateral size of the nanoparticles is between 20 and 55 μm and more preferably between 30 and 55 μm.

Preferably, the thickness of the coating is between 10 and 250 μm. For example, the thickness of the coating is between 10 and 100 μm or between 100 and 250 μm.

Advantageously, the steel substrate is a slab, a billet or a bloom.

Preferably, the binder is sodium silicate or the binder includes aluminum sulfate and an additive being alumina. In this case, without willing to be bound by any theory, it seems that the coating according to the present invention better adheres on the steel substrate so that the steel substrate is even more protected.

Thus, the risk of coating cracks and coating detachment, exposing the steel substrate to decarburization, is further prevented.

Preferably, the coating further comprises an organometallic compound. For example, the organometallic compound includes Dipropylene glycol monomethyl ether ($CH_3OC_3H_6OC_3H_6OH$), 1,2-Ethanediol ($HOCH_2CH_2OH$) and 2-ethylhexanoic acid, manganese salt ($C_8H_{16}MnO_2$). Indeed, without willing to be bound by any theory, it is believed that the organometallic compound allows for a fast curing of the coating avoiding a drying step at high temperature.

The invention also relates to a method for the manufacture of the coated steel substrate according to the present invention, comprising the successive following steps:
  A. The provision of a steel substrate having the above steel composition,
  B. The coating deposition using an aqueous mixture to form the coating and
  C. Optionally, the drying of the coated steel substrate obtained in step B).

Preferably, in step B), the deposition of the coating is performed by spin coating, spray coating, dip coating or brush coating.

Advantageously, in step B), the aqueous mixture comprises from 1 to 60 g/L of nanographite and from 150 to 250 g/L of binder. More preferably, the aqueous mixture comprises from 1 to 35 g/L of nanographite.

Preferably, in step B), wherein the aqueous mixture comprises nanographite comprising above 95% and advantageously 99% by weight of C.

Advantageously, in step B), the ratio in weight of nanographite with respect to binder is below or equal to 0.3.

Preferably, in step B), the aqueous mixture comprises an organometallic compound. More preferably, the concentration of the organometallic compound is equal or below to 0.12 wt. %. Indeed, without willing to be bound by any theory, it is believed that this concentration allows for an optimized coating without any curing or with a curing at room temperature.

In a preferred embodiment, the coating is dried in a step C). Without willing to be bound by any theory, it is believed that the drying step allows for an improvement of the coating adhesion. Indeed, since water evaporates, the binder becomes tackier and more viscous leading to a hardened condition. In a preferred embodiment, in step C), the drying is performed at room temperature or a temperature between 50 and 150° C. and preferably between 80 and 120° C.

In another preferred embodiment, no drying step is performed.

Preferably, in step C), when a drying is applied, the drying step is performed with hot air.

Advantageously, in step C), when a drying is applied, the drying is performed during 5 to 60 minutes and for example, between 15 and 45 minutes.

The invention also relates to a method for manufacture of a Hot rolled steel product comprising the following successive steps:
  I. The provision of the coated steel substrate according to the present invention,
  II. The reheating of the coated steel substrate in a reheating furnace at a temperature between 750 and 1300° C.,
  III. The descaling of the reheated coated steel sheet obtained in step II) and
  IV. The hot-rolling of the descaled steel product.

Preferably, in step I), the reheating is performed at a temperature between 800 and 1300° C., more preferably between 900 and 1300° C. and advantageously between 1100 and 1300° C.

Advantageously, in step II), the descaling is performed using water under pressure. For example, the water pressure is between 100 and 150 bars. In another embodiment, the descaling is performed mechanically, for example, by scratching or brushing the scale layer.

With the method according to the present invention, a hot rolled steel product wherein the surface is mainly not decarburized is obtained.

For example, after the hot-rolling, the hot product can be coiled, cold-rolled, annealed in an annealing furnace and also coated with a metallic coating.

Finally, the invention relates to the use of a hot rolled steel product obtainable from the method according to the present invention for the manufacture of a part of an automotive vehicle, a rail, a wire or a spring.

The invention will now be explained in trials carried out for information only.

They are not limiting.

EXAMPLES

In Examples, steels substrates having the following steel composition in weight percent were used:

| Steel | C | Mn | Si | Cu | Cr | Ti | V | Mo | Ni |
|---|---|---|---|---|---|---|---|---|---|
| 1 | 0.39 | 0.673 | 1.593 | 0.011 | 0.036 | 0.003 | 0.002 | 0.001 | 0.014 |
| 2 | 0.798 | 1.310 | 0.446 | 0.014 | 0.097 | 0.0014 | 0.0026 | 0.0018 | 0.016 |
| 3 | 0.901 | 0.309 | 0.244 | 0.017 | 0.215 | 0.002 | 0.002 | 0.001 | 0.019 |

Trial 1 was casted in the form of slab and Trials 2 and 3 were casted in the form of bloom.

Example 1: Decarburization Test

For some Trials, steels were coated by spraying an aqueous mixture comprising 30 g/L of nanographite having a lateral size between 35-50 µm, a binder being $Na_2SiO_3$ (sodium silicate) and optionally an organometallic compound being DriCAT® onto the steel. Then, optionally, the coating was dried at room temperature or during 30 minutes at 100° C.

Then, uncoated steels and coated steels were reheated at 1250° C. After the reheating, the trials were analyzed by optical microscopy (OM). 0 means that almost no decarburized areas are present at the trial surface, i.e. almost no decarburization happened, during the reheating and 1 means that a lot of decarburized areas are present at the surface of the trial.

The results are in the following Table 1:

For Trials according to the present invention, a very low amount of carbon was removed at the trial surface. On the contrary, for comparative Trials, a lot of decarburized areas were present allowing a change in the microstructure and therefore mechanical properties. Indeed, in the areas where there is a lot of carbon depletion, i.e. decarburized areas, ferrite is formed instead of pearlite.

Example 2: Microhardness Test

In this case, after the reheating at 1250° C., some Trials were quenched in water to form martensite and the microhardness evolution from the hot steel product surface to a depth of 1500 µm was determined by microhardness measurements. Indeed, when martensite is formed, the carbon content of the martensite is directly proportional to the amount of carbon in the microstructure. Therefore, the higher the microhardness is, the higher the carbon content is.

| | | | | Reheating step | | |
|---|---|---|---|---|---|---|
| Trials | Steels | Coating | Curing after coating deposition | temperature (° C.) | time | decarburization |
| 1* | 1 | Aqueous mixture | 30 min at 100° C. | 1250 | 3 h | 0 |
| 2* | 1 | Aqueous mixture | 30 min at 100° C. | 1250 | 6 h | 0 |
| 3 | 1 | — | — | 1250 | 3 h | 1 |
| 4* | 2 | Aqueous mixture | 30 min at 100° C. | 1250 | 2 h | 0 |
| 5* | 2 | Aqueous mixture | 30 min at 100° C. | 1250 | 6 h | 0 |
| 6* | 2 | Aqueous mixture including DriCAT® | No curing | 1250 | 6 h | 0 |
| 7* | 2 | Aqueous mixture including DriCAT® | Room temperature | 1250 | 6 h | 0 |
| 8 | 2 | — | — | 1250 | 2 h | 1 |
| 9* | 2 | Aqueous mixture | 30 min at 100° C. | 1250 | 3 h | 0 |
| 10 | 2 | — | — | 1250 | 3 h | 1 |
| 11 | 3 | Aqueous mixture | 30 min at 100° C. | 1250 | 3 h | 1 |
| 12 | 3 | — | — | 1250 | 3 h | 1 |

*according to the present invention.

The results are in the following Table 2:

| Trials | Steels | Coating | Reheating step temperature (° C.) | Reheating step time | Microhardness (HV) 100 (μm) | Microhardness (HV) 500 (μm) | Microhardness (HV) 1000 (μm) | Microhardness (HV) 1500 (μm) |
|---|---|---|---|---|---|---|---|---|
| 4* | 2 | Aqueous mixture | 1250 | 2 h | 840 | 840 | 840 | 840 |
| 8 | 2 | — | 1250 | 2 h | 280 | 420 | 600 | 700 |
| 9* | 2 | Aqueous mixture | 1250 | 3 h | 820 | 840 | 900 | 900 |
| 10 | 2 | — | 1250 | 3 h | 380 | 640 | 820 | 900 |

*according to the present invention.

The microhardness of Trials 4 and 9 clearly show that the decarburization was significantly reduced with the coated steel substrate according to the present invention compared to Trials 8 and 10.

What is claimed is:

1. A method for the manufacture of a coated steel substrate comprising:
   a steel substrate;
   a coating including nanographite flakes having a lateral size between 1 and 60 μm; and
   a binder, wherein the steel substrate has a composition in weight percent as follows:
   $0.31 \leq C \leq 1.2\%$,
   $0.1 \leq Si \leq 1.7\%$,
   $0.7 \leq Mn \leq 3.0\%$,
   $P \leq 0.01\%$,
   $S \leq 0.1\%$,
   $Cr \leq 0.5\%$,
   $Ni \leq 0.5\%$,
   $Mo \leq 0.1\%$,
   and on a purely optional basis, at least one of the following:
   $Nb \leq 0.05\%$,
   $B \leq 0.003\%$,
   $Ti \leq 0.06\%$,
   $Cu \leq 0.1\%$,
   $Co \leq 0.1\%$,
   $N \leq 0.01\%$,
   $V \leq 0.05\%$,
   a remainder of the composition being made of iron and inevitable impurities resulting from processing, the method comprising the successive following steps:
   providing the steel substrate; and
   depositing an aqueous mixture on the steel substrate to form the coating,
   wherein the steel substrate is a slab, a billet or a bloom.

2. The method as recited in claim 1 further comprising drying of the coating.

3. The method as recited in claim 1 wherein the depositing is performed by spin coating, spray coating, dip coating or brush coating.

4. The method as recited in claim 1 wherein the aqueous mixture includes from 1 to 60 g/L of nanographite and from 150 to 250 g/L of binder.

5. The method as recited in claim 1 wherein the aqueous mixture includes nanographite, the nanographite having above 95% by weight of C.

6. The method as recited in claim 5 wherein the nanographite in the aqueous mixture includes an amount of C equal to or above to 99% by weight.

7. The method as recited in claim 1 wherein a ratio in weight of nanographite with respect to binder is below or equal to 0.3.

8. The method as recited in claim 1 wherein the aqueous mixture includes an organometallic compound.

9. The method as recited in claim 8 wherein a concentration of the organometallic compound is equal to or below to 0.12 wt. %.

10. The method as recited in claim 2 wherein the drying is performed at a temperature between 5° and 150° C.

11. The method as recited in claim 2 wherein the drying is performed at room temperature.

12. The method as recited in claim 2 wherein the drying is performed with air.

13. The method as recited in claim 2 wherein the drying is performed for 5 to 60 minutes.

14. The method as recited in claim 1 wherein the lateral size of the nanoparticles is between 20 and 55 μm.

15. The method as recited in claim 1 wherein the lateral size of the nanoparticles is between 30 and 55 μm.

16. The method as recited in claim 1 wherein a thickness of the coating is between 10 and 250 μm.

17. The method as recited in claim 1 wherein the binder is sodium silicate or the binder includes aluminum sulfate and an additive being alumina.

18. The method as recited in claim 9 wherein the organometallic compound includes Dipropylene glycol monomethyl ether ($CH_3OC_3H_6OC_3H_6OH$), 1,2-Ethanediol ($HOCH_2CH_2OH$) and 2-ethylhexanoic acid, manganese salt ($C_8H_{16}MnO_2$).

19. The method as recited in claim 1 wherein the composition of the steel substrate includes in weight percent $1.1 \leq Mn \leq 2.0\%$.

20. A method for the manufacture of a coated steel substrate comprising:
   a steel substrate;
   a coating including nanographite flakes having a lateral size between 1 and 60 μm; and
   a binder, wherein the steel substrate has a composition in weight percent as follows:
   $0.31 \leq C \leq 1.2\%$,
   $0.1 \leq Si \leq 1.7\%$,
   $0.7 \leq Mn \leq 3.0\%$,
   $P \leq 0.01\%$,
   $S \leq 0.1\%$,
   $Cr \leq 0.5\%$,
   $Ni \leq 0.5\%$,
   $Mo \leq 0.1\%$,
   and on a purely optional basis, at least one of the following:
   $Nb \leq 0.05\%$,
   $B \leq 0.003\%$,
   $Ti \leq 0.06\%$,
   $Cu \leq 0.1\%$,
   $Co \leq 0.1\%$, N≤0.01%,
V≤0.05%,
a remainder of the composition being made of iron and inevitable impurities resulting from processing, the method comprising the successive following steps:
providing the steel substrate; and
depositing an aqueous mixture on the steel substrate to form the coating,
wherein the binder is sodium silicate or the binder includes aluminum sulfate and an additive being alumina.

21. A method for the manufacture of a coated steel substrate comprising:
a steel substrate;
a coating including nanographite flakes having a lateral size between 1 and 60 µm; and
a binder, wherein the steel substrate has a composition in weight percent as follows:
0.31≤C≤1.2%,
0.1≤Si≤1.7%,
0.7≤Mn≤3.0%,
P≤0.01%,
S≤0.1%,
Cr≤0.5%,
Ni≤0.5%,
Mo≤0.1%,
and on a purely optional basis, at least one of the following:
Nb≤0.05%,
B≤0.003%,
Ti≤0.06%,
Cu≤0.1%,
Co≤0.1%,
N≤0.01%,
V≤0.05%,
a remainder of the composition being made of iron and inevitable impurities resulting from processing, the method comprising the successive following steps:
providing the steel substrate; and
depositing an aqueous mixture on the steel substrate to form the coating,
wherein the organometallic compound includes Dipropylene glycol monomethyl ether (CH3OC3H6OC3H6OH), 1,2-Ethanediol (HOCH2CH2OH) and 2-ethylhexanoic acid, manganese salt (C8H16MnO2).

* * * * *